(12) United States Patent
Bagheri et al.

(10) Patent No.: US 10,919,585 B2
(45) Date of Patent: Feb. 16, 2021

(54) SYSTEM FOR TRAVELING ON A CYLINDRICAL OR FRUSTOCONICAL SURFACE

(71) Applicant: Fachhochschule Aachen, Aachen (DE)

(72) Inventors: Mohsen Bagheri, Aachen (DE); Josef Schleupen, Kempen (DE)

(73) Assignee: FACHHOCHSCHULE AACHEN, Aachen (DE)

( * ) Notice: Subject to any disclaimer, the term of this patent is extended or adjusted under 35 U.S.C. 154(b) by 282 days.

(21) Appl. No.: 15/737,766

(22) PCT Filed: Jul. 27, 2016

(86) PCT No.: PCT/EP2016/001297
§ 371 (c)(1),
(2) Date: Dec. 19, 2017

(87) PCT Pub. No.: WO2017/032438
PCT Pub. Date: Mar. 2, 2017

(65) Prior Publication Data
US 2018/0154954 A1 Jun. 7, 2018

(30) Foreign Application Priority Data
Aug. 21, 2015 (DE) .......................... 102015010804.2

(51) Int. Cl.
*B62D 5/065* (2006.01)
*B62D 55/14* (2006.01)
(Continued)

(52) U.S. Cl.
CPC ......... *B62D 55/075* (2013.01); *B62D 55/065* (2013.01); *B62D 55/14* (2013.01);
(Continued)

(58) Field of Classification Search
CPC .... B62D 55/075; B62D 55/065; B62D 55/14; B62D 55/26; B62D 57/024; F03D 80/50; B66B 9/00; E02B 17/0034; E04G 3/27
(Continued)

(56) References Cited

U.S. PATENT DOCUMENTS 2,751,259 A * 6/1956 Bonmartini ........ B62D 55/0847
305/44
3,053,351 A * 9/1962 Fulcher ..................... E04G 1/22
52/109
(Continued)

FOREIGN PATENT DOCUMENTS

DE 465292 B 9/1928
DE 465292 C * 9/1928 ............... E04G 3/28
(Continued)

*Primary Examiner* — Jacob D Knutson
(74) *Attorney, Agent, or Firm* — Andrew Wilford

(57) ABSTRACT

The invention relates to a travel system for cylindrical and/or conical surfaces, in particular for the outer surface or the inner surface of a pipe or mast (1), having: an assembly platform (4a, 4b); a plurality of connected undercarriage elements (6), preferably identical undercarriage elements (6), which form a closed ring in a circumferential direction, in particular together with the assembly platform (4a, 4b) integrated between two undercarriage elements (6); a clamping system (7) which connects at least the undercarriage elements (6) to each other and with which the distance between the connected undercarriage elements (6) can be changed; at least one other undercarriage element (8) which is situated on the assembly platform (4a, 4b) at an axial distance from the ring of connected undercarriage elements (6); wherein at least the undercarriage elements (6) connected to the ring, preferably also the undercarriage element (8) axially spaced therefrom, are each in the form of a continuous track system. The invention also relates to a continuous track vehicle (11), in particular a 2-track con- (Continued)

tinuous track vehicle (11), having at least one chain guided around two spaced deflection wheels (17), in particular deflection gears (17), running surface elements (20) being secured to the links (18) of the chain, wherein the running surface elements (20) each comprise rollers (21) for contacting a driving surface, the axes of rotation of the rollers being oriented in the direction in which the deflection wheels (17) are spaced or the running surface elements (20) being displaceable relative to the associated link (18) by at least one actuator (24).

9 Claims, 4 Drawing Sheets

(51) Int. Cl.
| | |
|---|---|
| *B62D 55/075* | (2006.01) |
| *E02B 17/00* | (2006.01) |
| *E04G 3/28* | (2006.01) |
| *F03D 80/50* | (2016.01) |
| *B66B 9/187* | (2006.01) |
| *B62D 57/024* | (2006.01) |
| *B66B 9/00* | (2006.01) |
| *B62D 55/065* | (2006.01) |
| *B62D 55/26* | (2006.01) |

(52) U.S. Cl.
CPC .......... *B62D 55/26* (2013.01); *B62D 57/024* (2013.01); *B66B 9/00* (2013.01); *B66B 9/187* (2013.01); *E02B 17/0034* (2013.01); *E04G 3/28* (2013.01); *F03D 80/50* (2016.05); *E02B 2017/0091* (2013.01); *E04G 2003/286* (2013.01); *Y02E 10/72* (2013.01)

(58) Field of Classification Search
USPC .......................................................... 180/9.1
See application file for complete search history.

(56) References Cited

U.S. PATENT DOCUMENTS

| | | | | |
|---|---|---|---|---|
| 3,074,764 | A | * | 1/1963 | Bertelsen ........... B62D 55/1125 |
| | | | | 305/120 |
| 2013/0228397 | A1 | * | 9/2013 | Horn ....................... F03D 80/50 |
| | | | | 182/141 |
| 2014/0158171 | A1 | * | 6/2014 | Doleshal ............. E02B 17/0034 |
| | | | | 134/172 |

FOREIGN PATENT DOCUMENTS

| | | | |
|---|---|---|---|
| EP | 3337939 B | 7/2019 | |
| ES | 2334959 A1 * | 3/2010 | ............ F03D 80/50 |
| ES | 2334959 B | 3/2010 | |
| JP | 2004257129 B | 9/2004 | |
| SU | 1307045 A1 | 4/1987 | |
| SU | 1307045 B | 4/1987 | |

\* cited by examiner

SYSTEM FOR TRAVELING ON A CYLINDRICAL OR FRUSTOCONICAL SURFACE

CROSS REFERENCE TO RELATED APPLICATIONS

This application is the US-national stage of PCT application PCT/EP2016/001297 filed 27 Jul. 2016 and claiming the priority of German patent application 102015010804.2 itself filed 21 Aug. 2015.

FIELD OF THE INVENTION

The invention relates to a system for traveling on a cylindrical or frustoconical surface. Such a surface can be the outer surface of an optionally tapering pipe or mast, for example. The travel system is also suitable for accessing the pipe interior, i.e. the inner surface of a pipe or the inner surface of a tubular mast.

Many applications require access to such surfaces having a cylindrical, optionally frustoconically tapering structure. For instance, tubular, for example horizontal pipelines must be accessed in order to perform maintenance work. The same applies to vertical pipes or masts, such as those of a wind-turbine generator. Besides for maintenance, a travel system is also used for the installation of rotor blades of such systems.

Travel systems are known in the prior art that are pulled longitudinally by a cable winch, for example, along the surface to be accessed, of a mast for example. Such travel systems are supported only on the surface and roll passively along it. The holding forces are applied substantially by the cable winch.

Moreover, travel systems are known that can climb vertically up a mast, for example in a self-actuated manner. These are stepper drives. The holding forces must be applied to the mast/pipe and are frequently applied only at points to the surface, which can cause damage, particularly when one of two alternately clamp-fastened stepper drives is detached for the purpose of moving in the stepping direction.

OBJECT OF THE INVENTION

It is therefore the object of the invention to provide a travel system that can travel by its own driving power along a cylindrical or frustoconical surface, such as that of a pipe or mast, particularly vertically, and with which the holding forces are distributed both spatially and temporally over a maximally large surface. An especially preferred embodiment is intended to enable both the outer and the inner surface of a pipe to be accessed.

SUMMARY OF THE INVENTION

This object is attained by a travel system with a working platform as well as a plurality of connected undercarriage elements, preferably identical undercarriage elements, that form a closed annular array in a circumferential direction, particularly together with the working platform that is integrated between two undercarriage elements, with a gripping structure that interconnects at least the undercarriage elements and with which the spacing between the connected undercarriage elements can be changed, as well as with at least one additional undercarriage element that is arranged on the working platform at an axial spacing from the annular array of the connected undercarriage elements, with at least the undercarriage elements that are connected to form a annular array, and preferably the undercarriage element spaced apart axially therefrom as well, each being embodied as a continuous-track drive.

Directional information such as "axial" or "radial" are made in the present description in relation to the annular array of undercarriage elements that encloses a pipe or a mast. The axial direction thus corresponds to the direction of longitudinal extension of the pipe/mast being traveled along and the radial direction is perpendicular thereto.

At least the continuous-track drives that are connected to form a annular array are driven, thus enabling the self-actuated traveling of the travel system along the surface. Through the use of continuous-track drives, the advantage is achieved that the forces on the surface are transferred not only at points, but rather along a line, preferably along a contact surface that extends in the direction of travel between the treads of the respective continuous-track drive and the surface. In order to enable a maximally large contact surface to be achieved, the tread elements of a continuous-track drive can be made of an elastomer that adapts to the curvature of the surface, for example.

Preferably, the at least one undercarriage element that is spaced apart from the undercarriage elements that form the annular array is also driven. In this way, the driving force is also distributed to as many undercarriage elements as possible.

The embodiment of the undercarriage elements as a continuous-track drive also ensures continuous travel along the surface, so that the forces introduced via the undercarriage elements into the surface are also distributed uniformly over time, which is not the case with stepper drives, for example, since at least one of the stepper drives is temporarily detached from the surface, and the forces are transferred by the remaining drive or drives. This results in a temporal unequal distribution of the forces.

In a travel system of this type that is traveling vertically, it is possible to provide, in addition to the undercarriage elements that are connected into a annular array, just one undercarriage element that is spaced apart axially therefrom that, when the travel system is arranged on a mast, is arranged beneath the undercarriage elements that are connected into a annular array and supports the entire travel system securely on the surface, thus preventing tipping about a horizontal axis.

In horizontally traveling travel systems of this type, a provision can also be made that at least one additional axially spaced undercarriage element is respectively arranged in front of and behind the undercarriage elements that are connected into a annular array in order to prevent the travel system from tipping over about a horizontal axis both in and counter to the direction of travel.

These additional undercarriage elements that are arranged outside of the annular array are only guided loosely on the surface.

In contrast, a force is applied toward the surface by the gripping structure to the undercarriage elements that are connected into a annular array, particularly under inclusion of the working platform, so that the travel system holds onto the surface that is encloses with the annular array, by these forces themselves.

For example, the gripping structure can be embodied by cables, belts, or another band-like element that can be placed circumferentially around a pipe or mast whose effective length circumferentially can be changed and with which a force can be applied via the undercarriage elements to the surface. By reducing the circumference, the clamping of the undercarriage elements and, for example, frictional engagement with the outer surface (of a pipe or mast, for example) can be achieved. It would be sufficient here to use a single drive that changes the circumference of the gripping structure.

A preferred embodiment makes a provision that the gripping structure is subdivided circumferentially into a plurality of elements, that each element connects two undercarriage elements that are spaced apart circumferentially, and that the length of each element circumferentially can be changed by at least one actuator. All of the clamping force to be applied is thus distributed to several actuators.

In an especially preferred embodiment, a provision can be made here that each element is embodied as a scissor joint chain or scissor joint lattice, particularly in the manner of lazy tongs with singly and/or multiply crossed scissor levers that are pivoted centrally at intersections. Such a scissor joint arrangement offers the advantage of not only enabling the length to be changed circumferentially, but also diverting forces that occur in the direction of travel, particularly in the case of travel systems traveling vertically, into the annular array assembly.

An especially stable construction is achieved if each element has at least two spaced-apart scissor joint chains or scissor joint lattices radially (with respect to the annular array that is formed). In this arrangement, the hinge points of the crossing scissor levers that are adjacent to each other radially, are connected to an axle (shaft).

The length of such a gripping element can be changed by a linear drive that is disposed circumferentially or perpendicular thereto and is supported on both sides on area of intersections or hinge axles. Preferably, all drives can be actuated at the same time here in order to always change the lengths of all of the simultaneously.

In the case of a travel system that drives on an outer surface, the undercarriage elements are arranged radially on the inside with respect to the gripping structure, so that the gripping structure itself is held by the undercarriage elements at a spacing from the surface to be traveled over.

In order to travel along interior surfaces of a pipe, the invention can also make a provision that the undercarriage elements are arranged radially on the outside with respect to the gripping structure. The gripping structure, or the individual elements, can thus press the undercarriage elements radially outward toward the inner surface of a pipe. This embodiment in particular advantageously includes scissor joint chains or lattices, since that enables forces to be generated that are oriented both radially inward and outward.

In an advantageous development, the invention can make a provision that each element has at its ends circumferentially at least one preferably axially spaced-apart connector on which a respective support element of a respective undercarriage element can be mounted in two orientations that are rotated by 180 degrees, particularly in a first orientation in which a respective undercarriage element is aligned radially inward with respect to the gripping structure and a second orientation in which a respective undercarriage element is aligned radially outward with respect to the gripping structure. In this way, the same travel system can travel optionally on outer and inner surfaces depending on the orientation that is selected. The axially spaced-apart connectors can be arranged at the ends of scissor levers lying circumferentially.

The invention can also preferably make a provision that one continuous-track drive, particularly every continuous-track drive, comprises at least one continuous-track truck. A provision is especially preferably made, however, that each continuous-track drive has a pair of two-track continuous-track trucks.

A "continuous-track truck" is understood here as referring to an arrangement in which at least one continuous track circulates between two deflection wheels, particularly deflection wheels, with the wheels being spaced apart in the direction of travel of the continuous-track truck and with at least one wheel, preferably the front deflection wheel in the direction of travel, being driven. Additional wheels can be arranged between the deflection wheels, or the at least one continuous track is guided in or over rails in the area between the deflection wheels. The latter construction is preferred in relation to the invention in order to ensure that the tread elements that are guided by a continuous track uniformly contact the surface that is being traveled over.

In a dual-track continuous-track truck, two continuous tracks are arranged next to one another and the deflection wheels have collinear or common axes, but the driven deflection wheels can be driven jointly or independently of one another.

The invention also relates to continuous-track trucks, particularly to dual-track continuous-track trucks of the aforementioned type, with the use of such continuous-track trucks described in the following as being in keeping with the invention not being limited to travel systems of the inventive type. Continuous-track trucks of the described type can also be employed in other means of transport, particularly motor vehicles, for example in any kind of so-called tracked vehicle or continuous-track truck, such as excavators, tanks, etc.

In such a continuous-track truck, the individual links have tread elements that can permanently or exchangeably connected to the links.

What is preferred here is a design in which the links of each continuous-track truck have tread elements that cooperate frictionally with a surface, which can be achieved through the formation of a respective tread from an elastomer, for example. This enables the tread surface that is facing toward the surface to be traveled over to adapt thereto.

However, a design can also be provided in which the tread elements cooperate in a form-fitting manner with the surface being traveled over, particularly through the formation of a respective tread having a surface structure that corresponds to a surface structure on the surface that is being traveled over.

Track drives of this type have the drawback that it is impossible to drive perpendicular to the direction in which the deflection wheels are spaced. As a result, neither travel systems of the inventive type nor other types of vehicle with continuous tracks according to the previously known art can perform such driving maneuvers. Travel systems of the described type therefore cannot travel around the pipe circumferentially in an axial position on the pipe being traveled upon. Other continuous-track trucks that comprise such track drives cannot travel exactly perpendicular to the main direction of travel (that exists, for example, if two links are driven equally, or is defined by the direction of the spacing of the deflection wheels). The invention is intended to open up such a possibility by further developing known track drives.

In a first embodiment, the tread elements of a track drive according to the invention can comprise rollers for this purpose, particularly at least one of which can be driven and/or braked, whose axes of rotation are aligned in the direction of travel of the continuous-track truck. By virtue of this design, a travel system can travel up a mast or along a pipe, for example, by actuating the drive or drives of the continuous-track trucks and be rotated circumferentially around the mast or the pipe through actuation of the rollers in the tread elements, particularly only in those tread elements that are currently in contact with the surface that is being traveled over. Such rollers can also be covered by a circulating belt.

During normal travel, the rollers can be braked, for example. Such a continuous-track truck according to the invention can also form part of an undercarriage element of any continuous-track truck, such as an excavator or tank, for example. It thus opens up the possibility of traveling perpendicular to the main direction of travel through actuation of the drive or drives of the rollers, at least of those that are in contact with the surface that is being traveled over. For example, continuous-track trucks can thus park in sidings perpendicular to the course of travel while remaining aligned with the course of the travel.

In another embodiment that is aimed at achieving a movement of the travel system or any other continuous-track trucks (tanks, excavators, etc.) circumferentially perpendicular to the main direction of travel, a provision can be made that the links of each continuous-track truck have tread elements that can be displaced relative to the respective link.

Such displaceability can be understood to mean that, using an actuating system (consisting of a plurality of actuators, for example) that is arranged between link and tread element, a respective tread element can be lifted from the surface, displaced laterally, preferably perpendicular to the direction of travel (direction of the spacing of the deflection wheels) and placed again onto the surface. This displacement, which can be performed successively for different tread elements, enables stepwise movement of the continuous-track drives and thus of the entire travel system circumferentially, or of another continuous track vehicle perpendicular to the main direction of travel.

Controllable linear drives, preferably at least three and especially preferably four linear drives can extend between link and tread element; in the case of four linear drives, these can form two pairs of two, with one pair being arranged at an angle to one another and the two pairs being arranged parallel to one another.

The linear drives, all of them or at least two respective ones of one of the abovementioned pairs, can have pivot points lying closely together on the side toward the link and pivot points that are farther apart on the side toward the tread element. The terms "closely together" and "farther apart" are therefore to be understood relatively to one another. The tread elements that can be moved by the linear drives can be preferably forcibly guided in their path of motion by at least one guide gear, preferably two equally constructed guide gears that extends or extend between link and respective tread element.

The linear drives can be actuated such that the superposition of their movements results in the aforementioned displacement, that is, the lifting-off, lateral displacement, and lowering of a respective tread element. Here, too, it is only necessary that the actuators be actuated for the execution of the displacement only by those tread elements that are facing toward the surface being traveled over or are in contact therewith or are currently traveling around a deflection wheel, particularly the front one. The other tread surfaces remain unactuated with respect to the displacement.

A provision can also be made according to the invention that the abovementioned actuators that bring about the displacement are controlled while a track drive is driven in the direction of travel by the circulating track.

Displacement can also be understood to mean that a tread element can be displaced relative to the link, particularly perpendicular to the direction in which the deflection wheels are spaced, particularly without changing the spacing to the link. For this purpose, a tread element can be connected via at least one linear guide to the link, for example, in which case the displacement can occur in the linear guide in a motor-driven manner.

A preferred embodiment of the continuous-track drives in the application for travel systems according to the invention can also make a provision that a respective continuous-track drive has a support element that can be connected to a gripping structure and the at least one continuous-track truck is fastened on the support element so as to be movable about a radial, preferably drivable pivot axle. Preferably, however, the invention makes a provision that a pair of dual-track continuous-track trucks (that is, two dual-track continuous-track trucks) are arranged on two sides around the radial, preferably drivable pivot axle and fastened by means thereof conjointly to the support element. When viewed in one direction, the radial pivot axle can thus lie in the center between the two dual-track track drives of the abovementioned pair, for example. A continuous-track drive therefore has a total of 4 continuous tracks, two of which are provided in each dual-track continuous-track truck and are preferably arranged symmetrically around the radial pivot axle.

Through the driving of the radially aligned pivot axle by an actuator, the direction of travel of the continuous-track truck, preferably of both continuous-track trucks, can be selected so as to differ from the direction of extension of the pipe/mast to be traveled along, so that a driving movement along the extension can be superposed with a driving movement circumferentially. That way, the travel system can travel helically around a mast or a pipe.

In one development that can be preferably combined with the previous embodiment, each of the two dual-track continuous-track trucks can be pivoted perpendicular to a respective radial pivot axle about its own preferably drivable axle disposed in the direction of travel, preferably between the two continuous tracks, with the two axles being preferably parallel. Such a design helps enable the continuous-track trucks, particularly the preferably flat surfaces of the tread elements, to conform tangentially to the circumferential curvature of a pipe/mast.

A provision can also be made according to the invention that at least one of the two dual-track continuous-track trucks of the continuous-track drive of a travel system is mounted on a support so as to be pivotal about an axle perpendicular to the direction of travel (direction of spacing of the deflection wheels) and perpendicular to the radial pivot axle, with the other dual-track continuous-track truck being particularly also fastened to the support. In one embodiment, this pivot axle can also be motor-driven in order to cause a rotation, particularly of one dual-track continuous-track truck relative to the other.

An assembly platform of a travel system according to the invention can have a first support that is integrated in its direction of longitudinal extension into the annular array of the connected undercarriage elements. For this purpose, one undercarriage element can be arranged in a hinged manner (perpendicular to the extension of the support) on each of the ends of the support, for example. Additional undercarriage element are then attached by the gripping structure to these first undercarriage elements on both sides.

The annular array that is formed can be preferably opened in order to enable the undercarriage elements to be placed with the gripping structure around a pipe or mast.

The annular array is then closed. The first support of the assembly platform is thus oriented circumferentially. This support can have a rectilinear extension but also a curvature that is adapted to an area of curvature over which the travel system can travel.

A second support can be arranged perpendicular to the extension of the first support that supports the at least one additional undercarriage element. First and second support can assume the geometric configuration of a T.

Any additional structures, such as a maintenance facility for servicing, for example, can be fastened to an assembly platform.

In one embodiment, a provision can also be made according to the invention that each element embodied as a scissor joint chain or scissor joint lattice has rollers on the upper hinge axles of the scissor lever rollers for the purpose of mounting on a vertical mast/pipe on which a work platform, particularly with a flat lower surface, can be rolled circumferentially around the mast/pipe.

According to the invention, two of the above-described travel systems can also be connected to their assembly platforms. To wit, a first of the two travel systems can be used to travel along a stationary pipe/mast, and the second travel system can be used in order to hold a mobile pipe or mast portion and move it relative to the first travel system. The two assembly platforms are preferably connected so as to be rotatable.

BRIEF DESCRIPTION OF THE DRAWING

Embodiments of the invention are explained with reference to the figures that describe the application of the travel system according to the invention to a wind-turbine generator. However, the features described in the following also apply to other applications, i.e. to all possible types of application.

In the drawing.

SPECIFIC DESCRIPTION OF THE INVENTION

Figure 1:
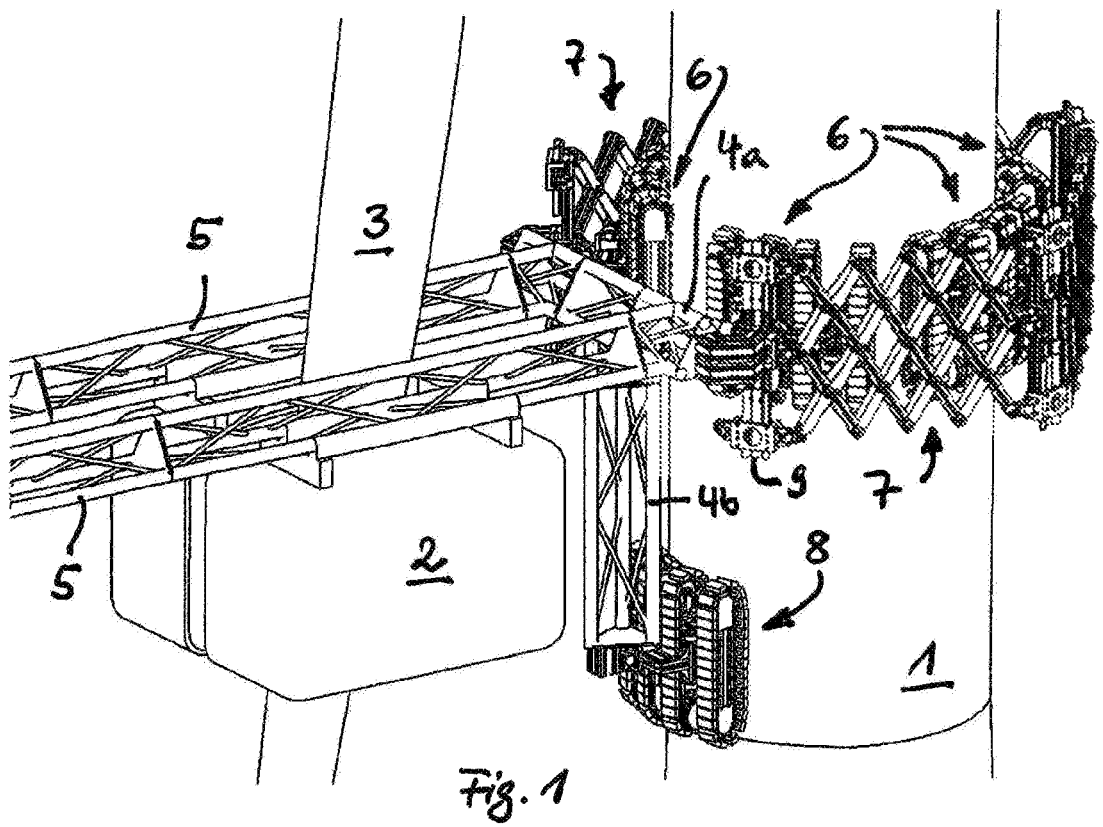
FIG. 1 is a perspective view of the invention.

FIG. 1 shows a section of a tubular mast 1 of a wind-turbine generator that tapers frustoconically toward the top. A travel system according to the invention carries a maintenance facility 2 here in order to service a rotor blade 3 and is secured to the mast 1.

The travel system comprises an assembly platform 4 with a first support 4a that is approximately horizontal here, and a second support 4b that is perpendicular thereto, that is, vertical. The supports form a T-shape.

Additional supports 5 are fastened hereto in order to carry the maintenance facility 2. These elements do not constitute an essential part of the invention.

First continuous-track drives 6 are arranged to the right and left side of the first support 4a on the ends thereof from which a gripping structure 7 extends circumferentially around the mast and that connects these first continuous-track drives 6 to other continuous-track drives 6 offset angularly therefrom.

Here, the continuous-track drives are each constructed from two dual-track track drives that are radially inward of the gripping structure 7. By changing the length of, in this case, shortening, the gripping structure 7, the spacing between the continuous-track drives 6 is reduced, thereby reducing the diameter or circumference of the annular array that the connected continuous-track drives lie on. The treads of the continuous-track drives are thus pressed radially inward against the mast surface, thereby holding the travel system in place by friction.

An additional continuous-track drive 8 is arranged at an axial spacing from the connected continuous-track drives 6 (relative to the mast/ring) that can be structurally identical to the continuous-track drives 6 that, for their part, are all identical to one another.

A tilting moment about a horizontal axis can thus be resisted by this additional continuous-track drive 8.

Figure 2:
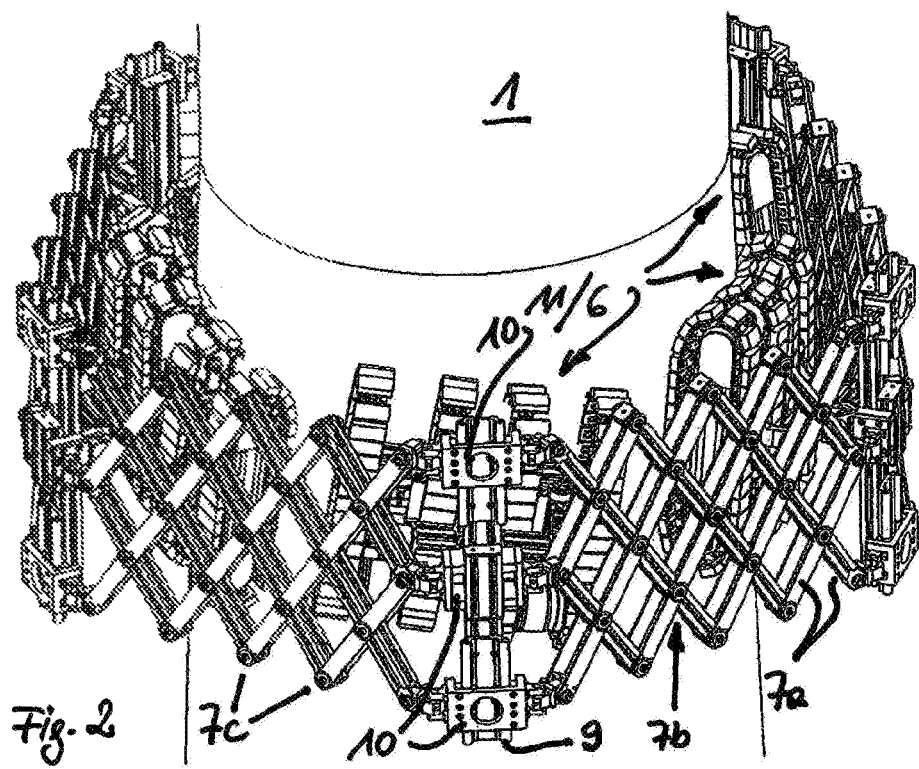
FIG. 2 is another perspective view of the invention.

FIG. 2 shows the formation of the annular array of the connected continuous-track drives 6 on the side of the mast 1 facing away from the assembly platform. It can be seen here that each continuous-track drive 6 has a support element 9 that is parallel to the direction of longitudinal extension of the mast and perpendicular to the plane spanned by the annular drive array.

This support element 9 of the continuous-track drives 6 is fastened, preferably detachably, by connectors 10 to the ends of the gripping structure 7 extending circumferentially.

The gripping structure 7 is embodied as scissor joint elements in the manner of a so-called lazy tongs, with scissor levers 7a that are pivoted together centrally at intersections 7b and at the respective ends 7c. The length circumferentially of each element of the scissor gear lattice or scissor joint network can be changed by linear drives (not shown here) between the intersections. The scissor joint lattice of a gripping structure 7 is duplicated radially.

Here, the continuous-track trucks 11 of the continuous-track drives 6 are arranged radially on the inside with respect to the scissor joint lattice 7. These continuous-track trucks are illustrated in detail in FIG. 3.

Figure 3:
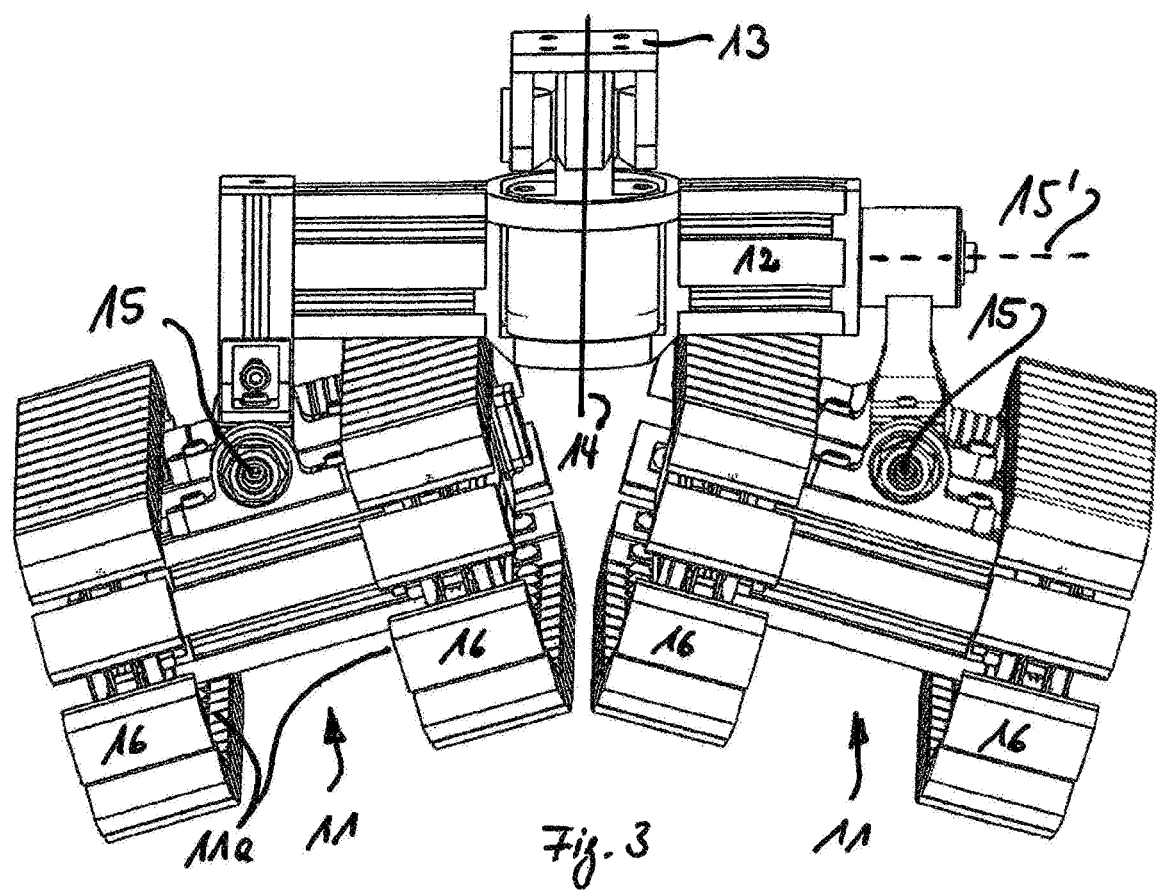
FIG. 3 is a large-scale view of two of one of the track drives the invention.

This FIG. 3 shows pivotal mounting of the continuous-track trucks 11 on a common support 12 on a mounting flange 13 of the support element 9 that is not shown here. The mount is such that the continuous-track trucks 11 can be rotated about a pivot axle 14 that extends radially. An actuator is integrated into the mount for controlling the rotation by motor.

The continuous-track drive 11 of the type shown here has two dual-track continuous-track trucks 11 that each have two continuous tracks 11a. The two continuous-track trucks are arranged on both sides of the pivot axle 14 and are mounted on the support 12 so as to rotate about axles 15 parallel to the direction of travel, i.e. the direction of circulation of the tracks, and in the direction in which the deflection wheels are spaced apart. As a result, the flat undersides of the tread elements 16 of the continuous-track trucks 11 can preferably conform tangentially to the circumferentially curved surface of the mast. The two continuous-track trucks 11 can be hung loosely, i.e. in a freewheeling manner, in the axles 15. FIG. 3 also shows that a continuous-track truck 11 (the one to the right in the figure) is additionally fastened, preferably in a motor-driven manner, on the support 12 so as to rotate about an axle 15' that is perpendicular to the axle 14 and perpendicular to the axle 15.

This enables the two vehicles 11 to tilt toward each other perpendicular to the direction of travel. In this embodiment, all of the cited axles 14, 15, and 15' are thus perpendicular to one another.

Figure 4:
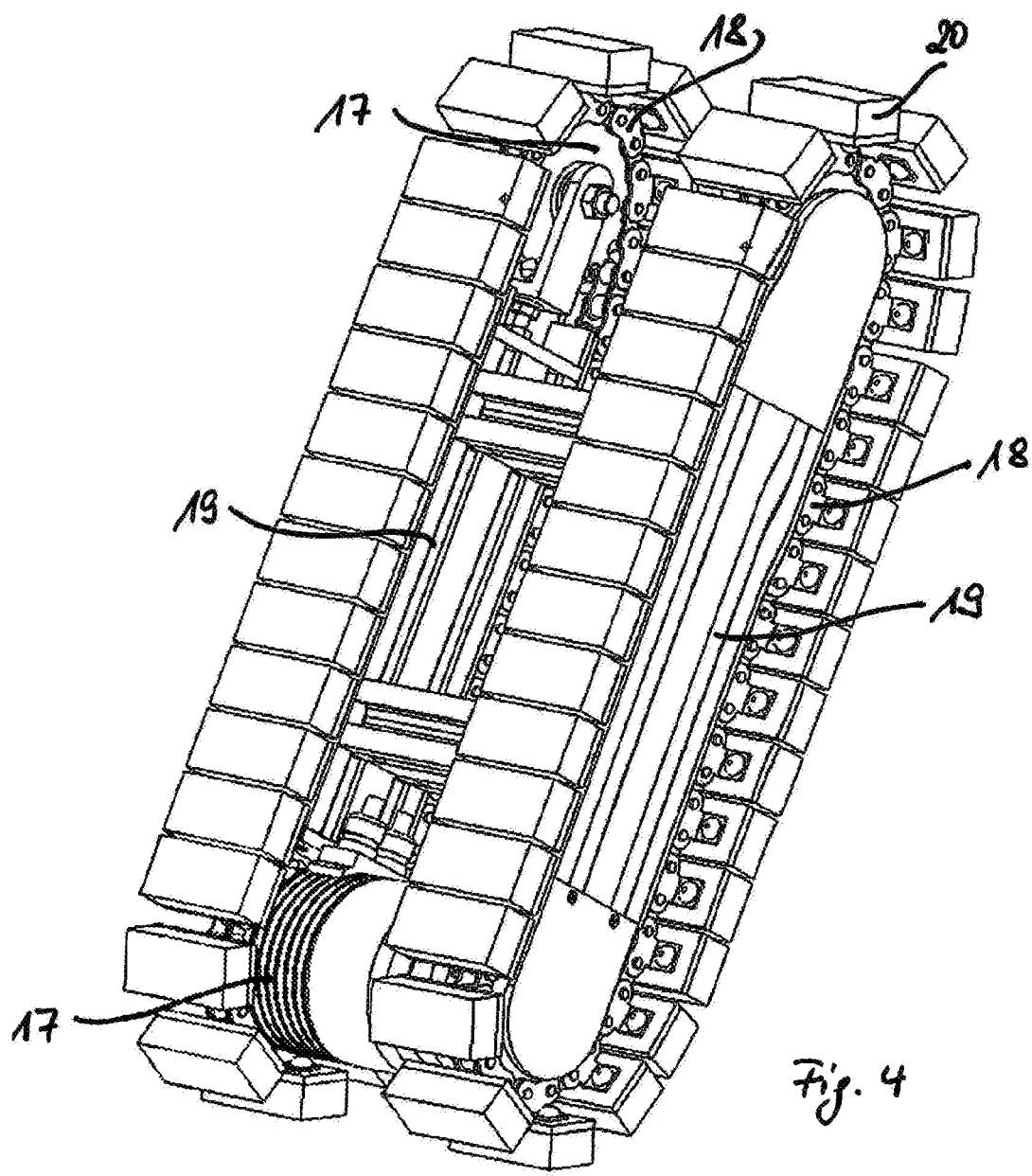
FIG. 4 is a perspective view of one of the drive trucks of this invention.

FIG. 4 shows a possible embodiment of a dual-track continuous-track truck 11. The continuous-track truck has deflection wheels 17 that are spaced apart in the direction of travel and around which the tracks are guided. The links 18 are guided on and/or in rails 19 between the deflection wheels.

Each link 18 carries a respective tread element 20 on the outside whose contact surface is made of an elastomer. These tread elements 20 can be removed and replaced thanks to a screw connection with the links 18.

Figure 5:
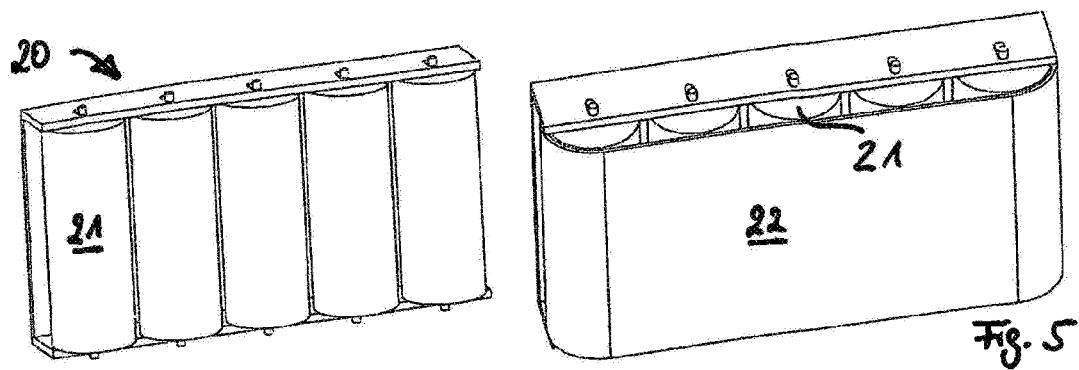
FIG. 5 shows details of the treads of the drive trucks of this invention.

FIG. 5 shows an embodiment of a tread element 20 that have several rollers 21 whose axes of rotation extend in the direction of travel, i.e. in the direction of motion. This enables a track drive to also be displaced circumferentially, for example by having at least one of the rollers 21 be driven. The rollers can be covered by a circulating belt 22.

Figure 6:
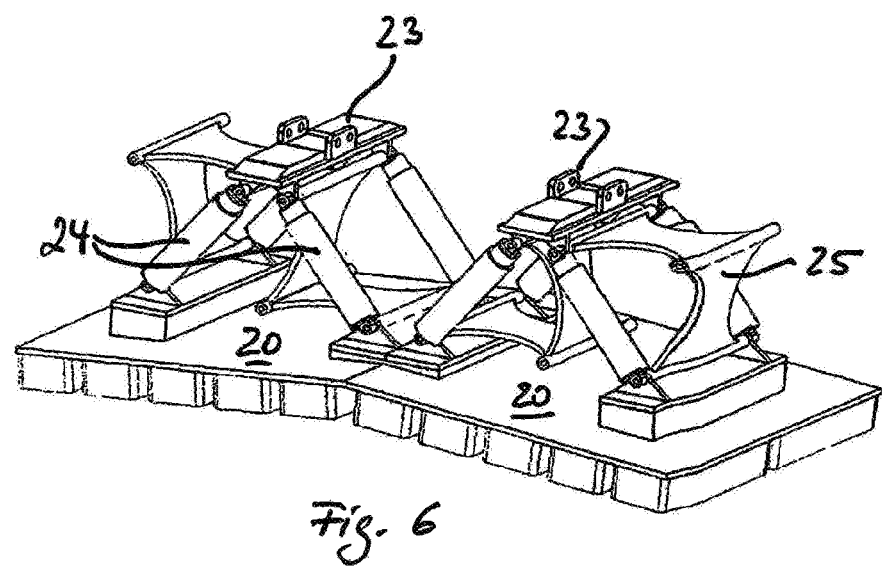
FIG. 6 is a perspective view of a variant of this invention.

FIG. 6 shows a different embodiment for achieving the mobility of the travel system circumferentially. Here, the tread elements 20 are connected to the links (not shown) by connectors 23, with an actuating system being located between the connectors and the tread elements 20 with which the tread elements can be displaced stepwise relative to the links.

For this purpose, two pairs of linear actuators 24 are arranged at an angle of 0<alpha<180 degrees between connector 23 and tread element 20. By retraction and extension of the linear actuators 24, a tread element 20 can be lifted from the surface of a mast, moved laterally, and lowered again onto the surface. This can take place during the circulation of the track. Through the successive actuation of the linear actuators 24 of different tread elements 20, a stepping movement circumferentially of the mast can be produced. The path of motion of each tread element is forcibly guided by the two guide gears 25, each of which consists of two levers that are fastened to each other and to the respective connector 23 and tread element 20 in this example.

Figure 7:
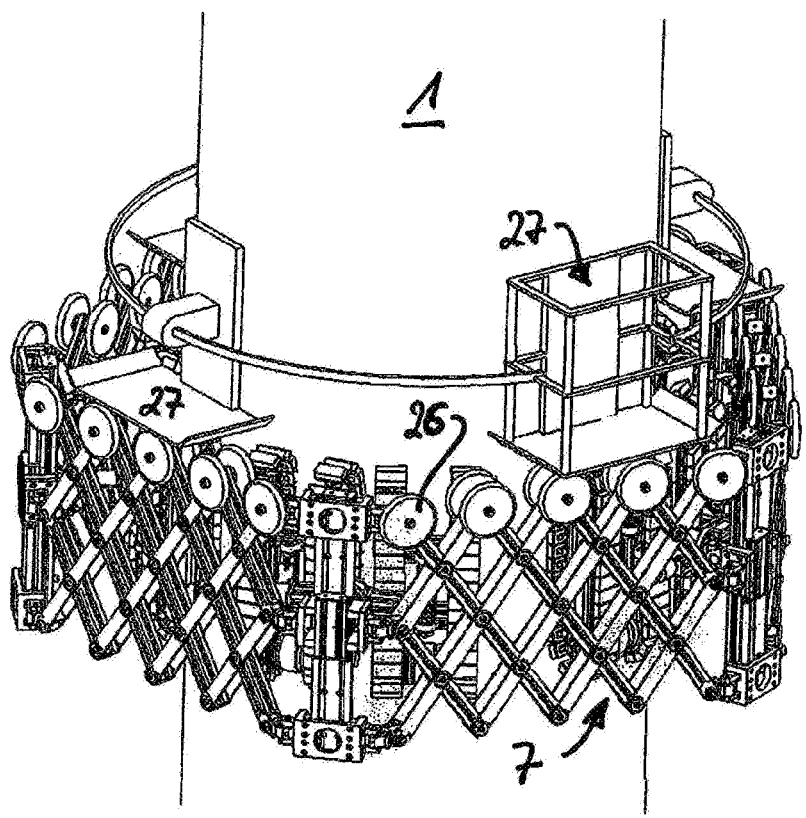
FIG. 7 is a perspective view of another system according to the invention.

FIG. 7 shows an embodiment in which the scissor gear lattice of the gripping structure 7 carries rollers 26 at the upper pivots of the respective scissor lever. The set of all rollers 26 forms a roller contact surface circumferentially around the mast 1 on which a maintenance cabins/unit 27 can be guided around the mast.

Even though the embodiments according to the invention of the track drives 11 have been described here in an application in a mast travel system, it should be noted that the track drives 11 shown in FIGS. 4, 5, and 6 can also be part of an undercarriage element of any tracked vehicle, such as an excavator or tank, for example.

The invention claimed is:

1. A system for traveling on a cylindrical or frustoconical surface, the system comprising:
   an assembly platform;
   a plurality of connected undercarriage elements that form a closed circumferential annular array with the assembly platform integrated between two of the undercarriage elements;
   a respective continuous-track drive on each of the undercarriage elements;
   a plurality of scissor-joint gripping structures that each circumferentially connect a respective two of the connected undercarriage elements to one another and with which a spacing between the respective connected undercarriage elements can be changed, each gripping structure being of variable circumferential length and having a plurality of crossed scissor levers that are pivoted centrally at intersections, each gripping structure having circumferentially and axially spaced end connectors each carrying a respective support element of the respective undercarriage element and each pivotable on the respective connector by 180° between a first orientation in which the respective undercarriage element is radially inward with respect to the gripping structure and a second orientation in which the respective undercarriage element is radially outward with respect to the gripping structure;
   respective actuators each for changing the circumferential length of a respective one of the gripping structures and the circumferential spacing between the respective undercarriage elements; and
   a plurality of continuous-track drives on the assembly platform at an axial spacing from the annular array of the connected undercarriage elements.

2. The travel system defined in claim 1, wherein each gripping structure has at least two scissor-joint chains or scissor-joint lattices spaced apart radially from and arranged next to one another.

3. The travel system defined in claim 1, wherein each continuous-track drive comprises a continuous-track truck.

4. The travel system defined in claim 3, wherein each undercarriage element has a support element connectable to the respective gripping structure and supporting the respective continuous-track drive truck for movement about a radial and drivable pivot axle.

5. The travel system defined in claim 3, wherein each continuous-track truck has links carrying respective interchangeable tread elements.

6. A system for traveling on a cylindrical or frustoconical surface, the system comprising:
   an assembly platform;
   a plurality of connected undercarriage elements that form a closed circumferential annular array with the assembly platform integrated between two of the undercarriage elements, each undercarriage element having a support element connectable to the respective gripping structure and supporting the respective continuous-track drive truck for movement about a radial and drivable pivot axle;
   a respective continuous-track drive on each of the undercarriage elements;
   a plurality of scissor-joint gripping structures that each circumferentially connect a respective two of the connected undercarriage elements to one another and with which a spacing between the respective connected undercarriage elements can be changed, each gripping structure being of variable circumferential length and having a plurality of crossed scissor levers that are pivoted centrally at intersections;
   respective actuators each for changing the circumferential length of a respective one of the gripping structures and the circumferential spacing between the respective undercarriage elements; and
   a plurality of continuous-track drives on the assembly platform at an axial spacing from the annular array of the connected undercarriage elements, each continuous-track drive having a respective continuous-track truck, each continuous-track truck having two such continuous tracks and being pivotal perpendicular to the respective radial pivot axle about a respective drivable axle extending in a direction of travel between the respective two continuous tracks, the two axles being parallel.

7. The travel system defined in claim 6, wherein at least one of the two continuous-track trucks is mounted on a support so as to be pivotal about an axis perpendicular to a direction of travel and perpendicular to the radial pivot axle, with the other dual-track continuous-track truck being also fastened to the support and not being pivotal about the same axis.

8. A system for traveling on a cylindrical or frustoconical surface, the system comprising:
   an assembly platform;
   a plurality of connected undercarriage elements that form a closed circumferential annular array with the assembly platform integrated between two of the undercarriage elements;
   a respective continuous-track drive on each of the undercarriage elements;
   a plurality of scissor-joint gripping structures that each circumferentially connect a respective two of the connected undercarriage elements to one another and with which a spacing between the respective connected undercarriage elements can be changed, each gripping structure being of variable circumferential length and having a plurality of crossed scissor levers that are pivoted centrally at intersections; and a plurality of continuous-track drives on the assembly platform at an axial spacing from the annular array of the connected undercarriage elements, each continuous-track drive having a respective continuous-track truck having links carrying respective interchangeable tread elements, the links of each continuous-track truck having tread elements that can be displaced relative to the respective link.

9. The travel system defined in claim 8, further comprising:
   controllable linear actuators displacing the tread elements and extending between each link and the respective tread element.

* * * * *